(12) United States Patent
Lim

(10) Patent No.: US 9,875,223 B2
(45) Date of Patent: Jan. 23, 2018

(54) APPARATUS AND METHOD FOR EDITING MEMO IN USER TERMINAL

(71) Applicant: Samsung Electronics Co., Ltd., Suwon-si, Gyeonggi-do (KR)

(72) Inventor: Kyung-Soo Lim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 46 days.

(21) Appl. No.: 14/089,129

(22) Filed: Nov. 25, 2013

(65) Prior Publication Data

US 2014/0157119 A1 Jun. 5, 2014

(30) Foreign Application Priority Data

Nov. 30, 2012 (KR) ........................ 10-2012-0137671

(51) Int. Cl.
*G06F 17/24* (2006.01)
(52) U.S. Cl.
CPC .................................. *G06F 17/241* (2013.01)
(58) Field of Classification Search
CPC ...... G06T 11/60; G06F 3/0481; G06F 3/0482; G06F 17/24
See application file for complete search history.

(56) References Cited

U.S. PATENT DOCUMENTS

| 5,428,805 | A | * | 6/1995 | Morgan | ........................ 708/141 |
| 5,588,108 | A | * | 12/1996 | Kumar | ................ G06F 3/04845 715/765 |
| 5,796,866 | A | * | 8/1998 | Sakurai et al. | ................ 382/187 |
| 6,104,833 | A | * | 8/2000 | Naoi et al. | ..................... 382/190 |
| 6,459,442 | B1 | * | 10/2002 | Edwards | ............. G06F 3/04883 715/700 |
| 7,372,993 | B2 | * | 5/2008 | Lagardere | ........... G06F 3/04883 382/186 |
| 7,574,048 | B2 | * | 8/2009 | Shilman | .............. G06F 3/04883 345/156 |
| 2002/0060675 | A1 | * | 5/2002 | Hashimoto | ............. G06T 11/60 345/204 |
| 2005/0183004 | A1 | * | 8/2005 | Lerner | .................. G06F 17/241 715/205 |
| 2010/0207898 | A1 | * | 8/2010 | Cha | .............................. 345/173 |
| 2012/0311439 | A1 | * | 12/2012 | Yang et al. | .................... 715/271 |

FOREIGN PATENT DOCUMENTS

KR 10-2010-0107615 A 10/2010

\* cited by examiner

*Primary Examiner* — Stephen Hong
*Assistant Examiner* — Hope C Sheffield
(74) *Attorney, Agent, or Firm* — Jefferson IP Law, LLP

(57) ABSTRACT

An apparatus and a method for editing memo contents of a user in a user terminal including a user interface are provided. When a part or all of the memo contents on a screen are damaged based on a memo function by using a prearranged pattern, the damaged part or all of the memo contents are deleted and a memo where the part or all of the memo contents have been deleted is displayed on the screen. At this time, the memo displayed on the screen has gone through an edit for filling a blank generated due to the deletion of the damaged part or all of the memo contents by moving successive memo contents to the deleted memo contents.

7 Claims, 8 Drawing Sheets

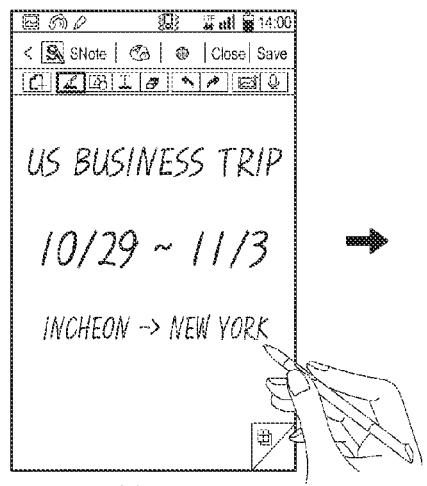
FIG.4A (RELATED ART)  FIG.4B (RELATED ART)
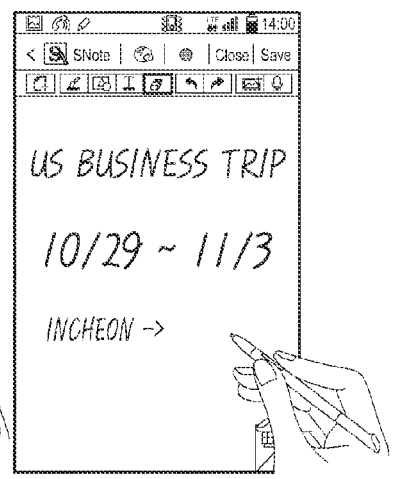
FIG.4C (RELATED ART)  FIG.4D (RELATED ART)
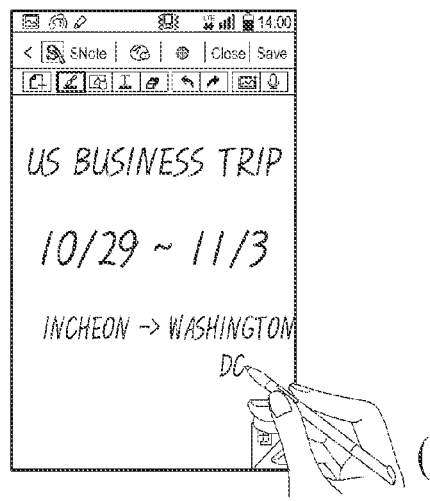
FIG.4E (RELATED ART)

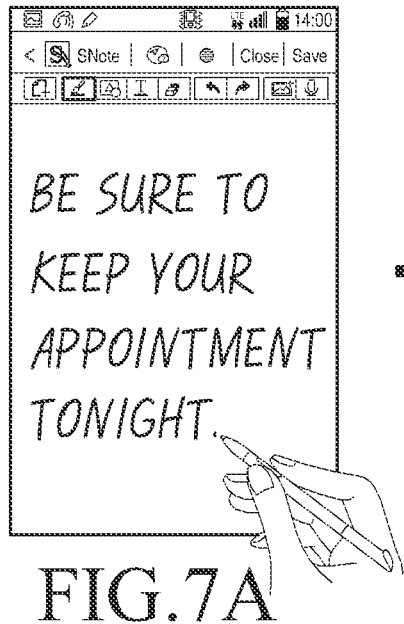 
FIG.7A  FIG.7B
 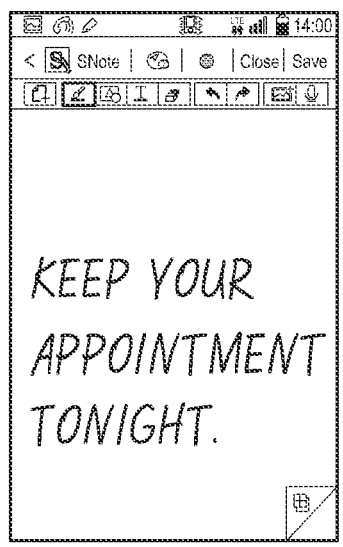  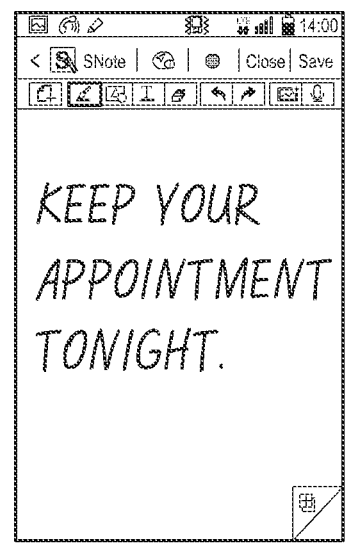
FIG.7C  FIG.7D

APPARATUS AND METHOD FOR EDITING MEMO IN USER TERMINAL

PRIORITY

This application claims the benefit under 35 U.S.C. §119 (a) of a Korean patent application filed on Nov. 30, 2012 in the Korean Intellectual Property Office and assigned Serial No. 10-2012-0137671, the entire disclosure of which is hereby incorporated by reference.

BACKGROUND OF THE INVENTION

1. Field of the Invention

The present invention relates to an apparatus and a method for editing a memo in a user terminal. More particularly, the present invention relates to an apparatus and a method for editing a memo content in a user terminal including a writing based user interface.

2. Description of the Related Art

Demands for a User Interface (UI) of a current portable device supporting an intuitive input/output have increased. For example, the user interface has evolved from a conventional UI where information is input by using a keyboard, a keypad, a mouse or the like to an intuitive UI where information is input by touching a screen using a finger, an electronic pen, or the like, or input using a voice.

Further, an intuitive UI technology has been anthropocentrically developed while considering the user's convenience. As a representative example, there is a UI technology through which a user communicates with a portable electronic device using voice, and accordingly, inputs desired information or acquires the desired information.

A typical example of the portable electronic device includes a smart phone. The smart phone has various applications installed thereon and provides a new function via the installed applications.

Further, the UI is mainly used only for making a memo of information by the user by using an input means, such as a finger, an electronic pen, or the like, in a user terminal supporting a memo function using a touch panel. However, there is no method of using the UI with interworking contents of the memo with another application.

FIGS. 4A to 4E illustrate an operation of deleting contents of a memo made in a user terminal including a writing based user interface according to the related art. FIGS. 4A to 4E sequentially show operations performed by the user to delete the contents of the memo.

Referring to FIGS. 4A to 4E, after executing an application corresponding to a memo function provided by the user terminal, the user writes particular contents by using a tool, such as a stylus pen or the like, in a memo screen provided through the execution of the application.

FIG. 4A shows an example of a memo made by the user, such as "U.S. business trip 10/29~11/3 Incheon→New York". That is, the example of the memo shows that "the user is due to have a business trip to US from October 29th to November 3th by plane from Incheon to New York".

When there is something to correct in the memo, the user selects a button corresponding to a "deletion function" from function buttons provided on the memo screen. In FIG. 4B, the user recognizes that there is something to delete or correct in the memo contents and performs an operation of selecting a deletion button provided on the memo screen by using a stylus pen.

After setting the deletion function, the user deletes a content which the user desires to delete from the memo contents displayed on the screen. FIG. 4C shows an example of an operation of deleting "New York" corresponding to a destination in order to change the destination from the memo displayed on the screen.

The user makes a memo to replace a blank generated by deleting a particular memo (see FIG. 4D) or a content deleted from another space or continuously makes a memo having a different content. FIG. 4E shows an example of an operation of inputting "Washington D.C." into the space where the previous destination has been deleted.

Of course, the user may delete a content in the middle of the memo and then not fill a space generated by deleting the information with another content unlike the example illustrated in FIGS. 4A to 4E. In this case, the space where the content has been deleted remains blank.

As described above, the user terminal including the conventional writing based user interface preferentially considers convenience of the implementation of functions according to the memo, so that user inconvenience is generated.

Accordingly, the user terminal including the writing based user interface requires an intuitive method through which the user can conveniently use the memo function.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for editing, based on a memo function, contents of a memo made in a user terminal supporting the memo function.

Further, another aspect of the present invention is to provide an apparatus and a method for deleting a part or all of the contents of a memo made based on a memo function in a user terminal supporting the memo function and accordingly, automatically controlling a sentence.

Moreover, another aspect of the present invention is to provide an apparatus and a method for, when a part of the contents of a memo made based on a memo function in a user terminal supporting a memo function is deleted, editing a sentence corresponding to the contents of the memo in order to fill a space generated by deleting the part of the memo.

Furthermore, another aspect of the present invention is to provide an apparatus and a method for supporting an intuitive user interface through which a user deletes a part of the contents of a memo based on a memo function in a user terminal supporting the memo function.

In accordance with an aspect of the present invention, a method of editing a memo based on a memo function in a user terminal supporting a writing based memo function is provided. The method includes, when a part or all of contents of the memo made on a screen are damaged by a user based on the memo function to an extent that the part or all of the contents of the memo cannot be normally recognized, deleting the damaged part or all of the contents from the memo, and displaying a memo where the part or all of the contents have been deleted on the screen.

In accordance with another aspect of the present invention, a user terminal for editing a memo displayed on a screen based on a writing based memo function is provided.

The user terminal includes a user interface for exchanging information according to the writing based memo function with a user, and a controller for, when a part or all of the contents of the memo made on the screen of the user interface are damaged by the user based on the memo function to an extent where the part or all of the contents of the memo cannot be normally recognized, deleting the damaged part or all of the contents from the memo and for controlling the user interface to display a memo where the part or all of the contents haven been deleted on the screen.

In accordance with another aspect of the present invention, a method of editing a memo based on a memo function in a user terminal supporting a writing based memo function is provided. The method includes recognizing contents of the memo made by a user based on the memo function and displaying the recognized contents on a screen, when a part or all of displayed contents are damaged to an extent where the part or all of the contents cannot be normally recognized, by newly displayed contents on the screen, recognizing the newly displayed contents as a request for deleting the damaged contents, and, when the request for deleting the damaged contents is recognized, displaying, on the screen, edited contents where the damaged contents have been deleted from the displayed contents on the screen.

In accordance with another aspect of the present invention, a user terminal for editing a memo displayed on a screen based on a writing based memo function is provided. The user terminal includes a user interface for exchanging information according to the writing based memo function with a user, and a controller for performing a control for displaying, through a screen of the user interface, contents of a memo made by the user through the user interface, wherein the controller recognizes contents of the memo made by the user through the user interface and controls the user interface to display the recognized contents on the screen, when a part or all of displayed contents are damaged to an extent where the part or all of the contents cannot be normally recognized, by newly displayed contents on the screen, recognizes the newly displayed contents as a request for deleting the damaged contents, and, when the request for deleting the damaged contents is recognized, displays edited contents where the damaged contents are deleted from the displayed contents on the screen, on the screen.

According to an exemplary embodiment of the present invention, it is possible to activate the use of a memo function performed in a user terminal by using an electronic pen or the like.

Further, it is possible to allow a user to use a function supported by the user terminal without repulsion by providing an intuitive interface to the user.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 4A to 4E illustrate operations of deleting contents of a memo made in a user terminal including a writing based user interface according to the related art; and FIGS. 5A to 8D illustrate various operations according to exemplary embodiments of the present invention.

Throughout the drawings, it should be noted that like reference numbers are used to depict the same or similar elements, features, and structures.

DETAILED DESCRIPTION OF EXEMPLARY EMBODIMENTS

Figure 1:
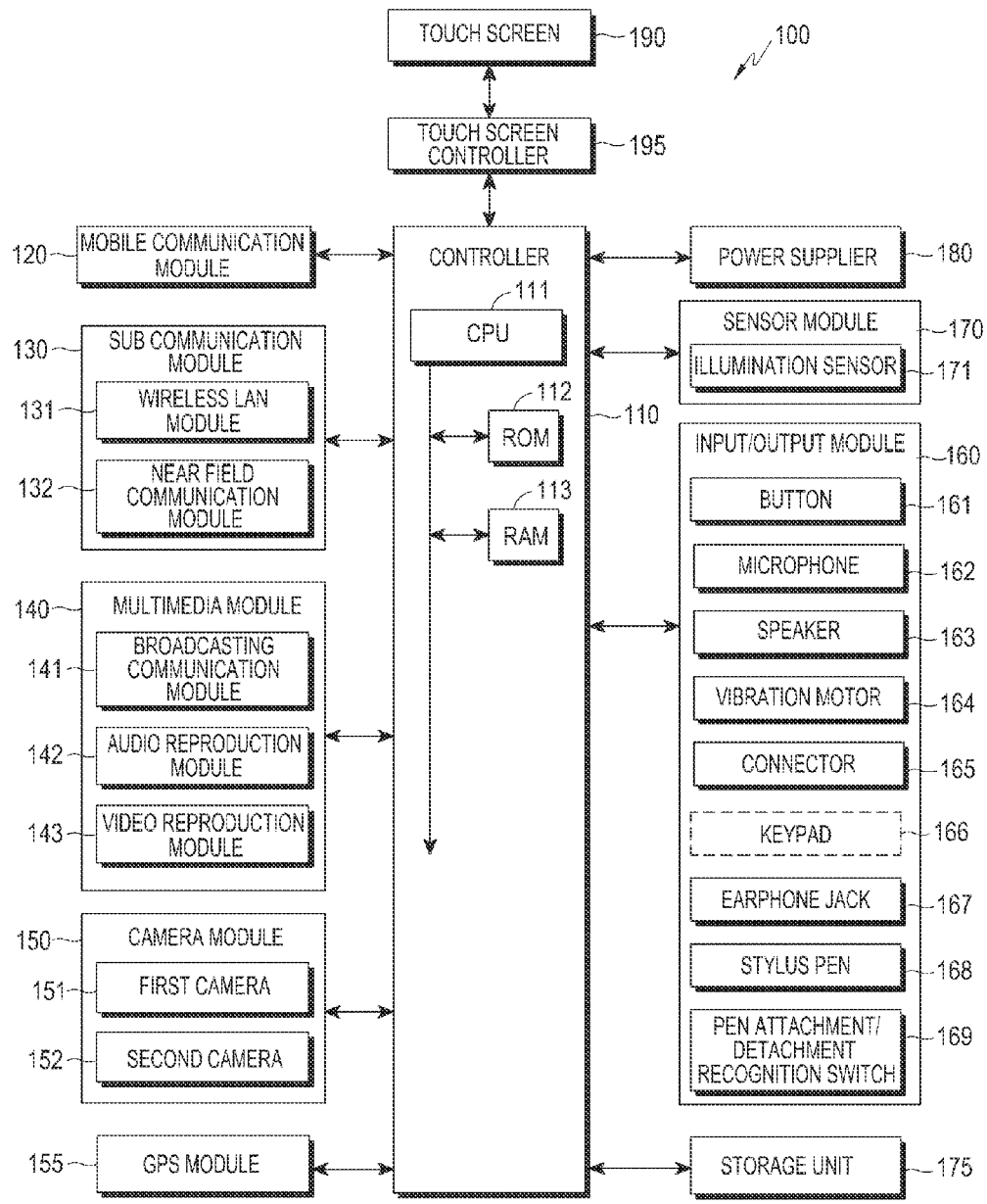
FIG. 1 is a block diagram schematically illustrating a configuration of a wireless terminal according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In exemplary embodiment of the present invention described below, there is provided a method of deleting a content of a memo damaged by a user from contents of the memo made on a touch screen, editing the contents of the memo on the touch screen in consideration of the deletion of the content of the memo, and displaying the edited memo contents.

To this end, the user terminal should be able to identify whether the user damages a part or all of the contents of the memo on the touch screen based on the memo function by using a prearranged pattern.

Further, when the user terminal recognizes that a particular memo content is damaged by the user, the user terminal deletes the damaged content, edits the memo contents to process a blank generated due to the deletion, and displays the edited memo contents. The user terminal performs an editing function for replacing the deleted memo content with a new memo content and displaying the new memo content.

In the detailed description of exemplary embodiments of the present invention provided below, the term "damage" will be used to denote an action in which the user terminal cannot normally recognize a meaning of the previously written content since the user writes additional content on the previously written content.

Here, various examples will be provided to describe the case where the user terminal cannot normally recognize the meaning of the previously written content.

For example, if it is assumed that the content is damaged in units of syllables, the content is determined as being in a normally non-recognizable state when a meaning of a previously written syllable, damaged by the additional writing of the user, cannot be recognized at all or when a predetermined number or more of candidate words are recommended for the previously written syllable due to the damage.

As another example, if it is assumed that the content is damaged in units of phonemes, the content is determined as being in a normally non-recognizable state when an image of a conventionally written phoneme displayed on the screen and an image displayed on the screen by the additional writing of the user overlap each other on a preset number of coordinate points. That is, when at least three coordinates in an image of a conventionally displayed phoneme "ㄱ" overlap an additionally written content, it is determined that "ㄱ" is damaged.

However, in an exemplary embodiment of the present invention, the conventionally written content may be temporarily stored in a buffer as necessary in order to determine whether the conventionally written content is damaged. More particularly, in determining the damage in units of phonemes, the conventionally written content should be necessarily stored in the buffer.

Hereinafter, exemplary embodiments of the present invention will be described with reference to the accompanying drawings. It should be noted that the same components of the drawings are designated by the same reference numeral anywhere. Further, a detailed description of known functions and configurations incorporated herein will be omitted when it may make the subject matter of the present invention rather unclear.

FIG. 1 schematically illustrates a configuration of a wireless terminal according to an exemplary embodiment of the present invention by using function blocks.

Referring to FIG. 1, a wireless terminal 100 includes a control block, a communication block, a User Interface (UI) block, and an information processing block.

The control block refers to a set of function blocks provided to control a general operation of the wireless terminal 100, and the communication block refers to a set of function blocks provided to exchange information with an external device (not shown). The UI block refers to a set of function blocks provided to exchange information with the user, and the information processing block refers to a set of function blocks provided to execute an application within the wireless terminal 100.

The control block corresponds to a controller 110 illustrated in FIG. 1. The controller 110 includes a Central Processing Unit (CPU) 111, a Read Only Memory (ROM) 112, and a Random Access Memory (RAM) 113.

The communication block may be connected to an external device (not shown) by using a mobile communication module 120, a sub communication module 130, and a connector 165. Here, the "external device" commonly refers to a device capable of exchanging information with the wireless terminal 100 through a predetermined medium. For example the external device may be a Personal Computer (PC), a notebook PC, a content server, a web server, or the like, and the predetermined medium may be a communication channel by a wired communication cable, a radio resource, or the like.

The sub communication module 130 includes a wireless Local Area Network (LAN) module 131, and a near field communication module 132. The connector 165 may be included in the communication block or the UI block.

The UI block is a means for exchanging information with the user, which includes a touch screen 190, a touch screen controller 195, a camera module 150, a sensor module 170, and an input/output module 160. The camera module 150 includes one or a plurality of cameras (for example, a first camera 151 and a second camera 152). The input/output module 160 includes at least one of a button 161, a microphone 162, a speaker 163, a vibration motor 164, the connector 165, a keypad 166, an earphone jack 167, a stylus pen 168, and a pen attachment/detachment recognition switch 169.

The information processing block includes a multimedia module 140, a GPS module 155, and a storage unit 175. The multimedia module 140 includes at least one of a broadcasting communication module 141, an audio reproduction module 142, and a video reproduction module 143.

In a configuration of the control block, the CPU 111 is configured by a single core, a dual core, a triple core, or a quad core, and processes a control according to an actual operation of the wireless terminal 100. The ROM 112 stores a control program for controlling the wireless terminal 100, and the RAM 113 stores a signal or data input from the outside of the wireless terminal 100 or is used as a storage area for an operation performed in the wireless terminal 100.

The CPU 111, the ROM 112, and the RAM 113 may be mutually connected through an internal bus.

The controller 110 may control the mobile communication module 120, the sub communication module 130, the multimedia module 140, the camera module 150, the GPS module 155, the input/output module 160, the sensor module 170, a power supplier 180, the storage unit 185, the touch screen 190, and the touch screen controller 195.

The controller 110 recognizes contents of a memo made by the user through the touch screen 190 of the UI block and controls the touch screen controller 195 to display the recognized contents through the touch screen 190.

More particularly, the controller 110 recognizes contents of a memo made on the touch screen 190 by the user through the touch screen controller 195 and controls the touch screen controller 195 to display the recognized contents on the touch screen 190. Further, the controller 110 monitors, through the touch screen controller 195, whether a part or all of the conventionally displayed contents are damaged by newly displayed contents on the touch screen 190.

When it is detected that the part or all of the conventionally displayed contents are damaged, the controller 110 recognizes the detection as a request for deleting the damaged contents. Accordingly, the controller 110 controls the touch screen controller 195 to display, on the touch screen 190, edited contents where the damaged contents are deleted from the contents displayed on the touch screen 190.

For example, when it is recognized, through the touch screen controller 195, that an action of drawing a line on a part or all of the contents displayed on the touch screen 190 is performed or an action of painting over the part or all of the contents is performed, the controller 110 detects that the part or all of the contents are damaged.

When the controller 110 detects a deletion request due to the damage of the memo contents, one or more additional conditions may be considered. For example, the controller 110 may detect the deletion request only when the drawing of the line or painting over the contents is performed using the same color as that of the memo contents. Such an exemplary implementation prevents the case in which a line or paint drawn over the contents by the user using another color to emphasize the memo contents is improperly detected as a deletion request.

In order to edit the memo contents, the controller 110 controls the touch screen controller 195 to delete the damaged contents by moving an area where the damaged contents are displayed to the left or right side on the touch screen 190. Further, the controller 110 controls the touch screen controller 195 to move an area where the remaining contents after the damaged contents are displayed to a blank area generated by the deletion of the memo contents on the touch screen 190.

In another exemplary implementation, the controller 110 deletes the damaged memo contents and provides new memo contents edited from the remaining memo contents in consideration of the deleted memo contents to the touch screen controller 195 to allow the edited memo contents to be displayed on the touch screen 190.

For example, the edited memo contents may be obtained through a movement making a start point in the black area generated by the movement of the area displaying the damaged contents match with a start point in the area displaying the remaining contents after the damaged contents.

The controller 110 may inquire whether a deletion or an edit is required before deleting or editing the memo contents through the touch screen 190 or other components within the UI block. In this case, the controller 110 performs a control for the deletion or the editing of the memo contents only when the deletion or the edit is requested by the user in response to the inquiry.

The controller 110 may receive the response of the user to the inquiry through one of an input of a function button displayed on the touch screen 190, recognition of an operation set by a deletion instruction through the camera module 150, an input of a touch pattern set by a deletion instruction through the touch screen 190, and the like.

In an exemplary configuration of the communication block, the mobile communication module 120 connects the wireless terminal 100 with an external device through mobile communication by using one or a plurality of antennas (not shown) according to a control of the controller 110. For example, the mobile communication module 120 transmits/receives a wireless signal for a voice call, a video call, a Short Message Service (SMS), or a Multimedia Message Service (MMS) with a mobile phone, a smart phone, a tablet PC, or another device having a telephone number input into the wireless terminal 100.

The sub communication module 130 may include at least one of the wLAN module 131 and the near field communication module 132. For example, the sub communication module 130 may include only the wireless LAN module 131, only the near field communication module 132, or both the wLAN module 131 and the near field communication module 132.

The wLAN module 131 may be connected to the Internet according to a control of the controller 110 in a place where a wireless Access Point (AP) is installed. The wLAN module 131 supports a wLAN standard of IEEE (i.e., IEEE 802.11x).

The near field communication module 132 wirelessly performs near field communication between the wireless terminal 100 and an image forming device according to a control of the controller 110. At this time, as a near field communication method, Bluetooth communication, Infrared Data Association (IrDA) communication, or the like may be used.

The wireless terminal 100 may include at least one of the mobile communication module 120, the wLAN module 131, and the near field communication module 132. For example, the wireless terminal 100 may include a combination of the mobile communication module 120, the wLAN module 131, and the near field communication module 132 according to its capability.

In a configuration of the UI block, the camera module 150 may include at least one of the first camera 151 and the second camera 152 for photographing a still image or a video according to a control of the controller 110. Further, the first camera 151 or the second camera 152 may include an auxiliary light source (for example, a flash (not shown)) for providing a light amount required for the photographing. The first camera 151 may be disposed in a front surface of the wireless terminal 100, and the second camera 152 may be disposed in a rear surface of the wireless terminal 100.

The input/output module 160 may include at least one of a plurality of buttons 161, the microphone 162, the speaker 163, the vibration motor 164, the connector 165, and the keypad 166. Here, the buttons 161 may be formed on a front surface, a side surface, or a rear surface of a housing of the wireless terminal 100, and include at least one of a power/lock button, a volume button, a menu button, a home button, a back button, and a search button 161.

The microphone 162 receives a voice or a sound to generate an electrical signal according to a control of the controller 110.

The speaker 163 may output sounds corresponding to various signals (for example, a wireless signal, a broadcasting signal, a digital audio file, a digital video file, photographing a picture, or the like) of the mobile communication module 120, the sub communication module 130, the multimedia module 140, or the camera module 150 to the outside of the wireless terminal 100 according to a control of the controller 110. The speaker 163 may output sounds (for example, a button control sound corresponding to phone communication, or a ring back tone) corresponding to functions performed by the wireless terminal 100. One speaker 163 or a plurality of speakers 163 may be formed in a proper position or positions of the housing of the wireless terminal 100.

The vibration motor 164 may convert an electrical signal to a mechanical vibration according to a control of the controller 110. For example, when the wireless terminal 100 in a vibration mode receives a voice call from another device, the vibration motor 164 operates. One vibration motor 164 or a plurality of vibration motors 164 may be formed within the housing of the wireless terminal 100. The vibration motor 164 may operate in response to a touch action of the user on the touch screen 190 and successive motions of touches on the touch screen 190.

The connector 165 may be used as an interface for connecting the wireless terminal 100 with an external device or a power source. The connector 165 may transmit data stored in the storage unit 175 of the wireless terminal 100 to the external device or receive data from the external device through a wired cable connected to the connector 165 according to a control of the controller 110. A battery (not shown) may be charged with power supplied from a power source through the wired cable connected to the connector 165.

The keypad 166 may receive a key input from the user to control the wireless terminal 100. The keypad 166 includes a physical keypad formed in the wireless terminal 100 or a virtual keypad displayed on the touch screen 190. The physical keypad formed in the wireless terminal 100 may be omitted according to a capability or a structure of the wireless terminal 100.

The sensor module 170 includes at least one sensor for detecting a state of the wireless terminal 100. For example, the sensor module 170 may include a proximity sensor (not shown) for detecting whether the user approaches the wireless terminal 100 or for detecting an approach of a finger or a pen 200 to the screen, an illumination sensor 171 for detecting an amount of light adjacent to the wireless terminal 100, or an acceleration sensor (not shown) for detecting a motion of the wireless terminal 100 (for example, rotation of the wireless terminal 100, and an acceleration or a vibration applied to the wireless terminal 100). At least one sensor may detect a state including a direction and slope of the wireless terminal 100, generate a signal corresponding to the detection, and transmit the generated signal to the controller 110. Other sensors may be added or the described sensors may be omitted according to the capability of the wireless terminal 100.

The touch screen 190 may provide a user interface corresponding to various services (for example, a phone call, data transmission, broadcasting, and photographing a picture) to the user. The touch screen 190 may transmit an analog signal corresponding to at least one touch input into the user interface to the touch screen controller 195. The touch screen 190 receives one or more touches through various objects, for example, a body part of the user (for example, fingers including a thumb) or a touchable input means, for example, an electronic pen (stylus pen). Also, the touch screen 190 may receive successive motions of one touch among the one or more touches. The touch screen 190 may transmit an analog signal corresponding to successive motions of the input touch to the touch screen controller 195.

Here, the touch may include non-touches without being limited to touches between the touch screen 190 and the body part of the user or the touchable input means. A detectable interval of the touch screen 190 may be changed according to a capability or a structure of the wireless terminal 100. The touch screen 190 may be implemented in various types, for example, a resistive type, a capacitive type, an infrared type, an Electronic Magnetic Resonance (EMR) type, an acoustic wave type, or the like. In addition, the touch screen 190 may be implemented by a combination of one or more types.

More particularly, the touch screen 190 displays not only memo contents recognized by the controller 110 under a control of the touch screen controller 195 but also memo contents edited by a deletion request of the user under a control of the touch screen controller 195.

In a configuration of the information processing block, the multimedia module 140 may include the broadcasting communication module 141, the audio reproduction module 142, or the video reproduction module 143.

The broadcasting communication module 141 may receive a broadcasting signal (for example, a TV broadcasting signal, a radio broadcasting signal, or a data broadcasting signal) and broadcasting supplement information (for example, an Electric Program Guide (EPG) or an Electric Service Guide (ESG)) broadcasted from a broadcasting station through a broadcasting communication antenna according to a control of the controller 110.

The audio reproduction module 142 may reproduce a digital audio file (for example, a file having a filename extension of mp3, wma, ogg, wav, etc.) stored or received according to a control of the controller 110.

The video reproduction module 143 may reproduce a digital video file (for example, a file having a filename extension of mpeg, mpg, mp4, avi, mov, mkv, etc.) stored or received according to a control of the controller 110. The video reproduction module 143 may reproduce the digital audio file.

The multimedia module 140 may include the audio reproduction module 142 and the video reproduction module 143 but not the broadcasting communication module 141. Also, the audio reproduction module 142 or the video reproduction module 143 of the multimedia module 140 may be included in the controller 110.

The GPS module 155 receives radio waves from a plurality of GPS satellites in Earth orbit. The GPS module 155 may calculate a position of the wireless terminal 100 by using Time of Arrival from the GPS satellite to the wireless terminal 100.

The storage unit 175 may store signals or data input/output in accordance with operations of the mobile communication module 120, the sub communication module 130, the multimedia module 140, the camera module 150, the GPS module 155, the input/output module 160, the sensor module 170, and the touch screen 190 according to a control of the controller 110. The storage unit 175 may store a control program and applications for controlling the wireless terminal 100 or the controller 110.

Here, the term "storage unit" includes the storage unit 175, the ROM 112 or the RAM 113 within the controller 110, and the memory card (not shown) (for example, an SD card, a memory stick, etc.) mounted to the wireless terminal 100. The storage unit 175 may include a nonvolatile memory, a volatile memory, a Hard Disk Drive (HDD), a Solid State Drive (SSD), and the like.

The power supplier 180 may supply power to one battery or a plurality of batteries disposed in the housing of the wireless terminal 100 according to a control of the controller 110. The one or plurality of batteries supply power to the wireless terminal 100. Also, the power supplier 180 may supply power input from an external power source through the wired cable connected to the connector 165 to the wireless terminal 100.

Figure 2:
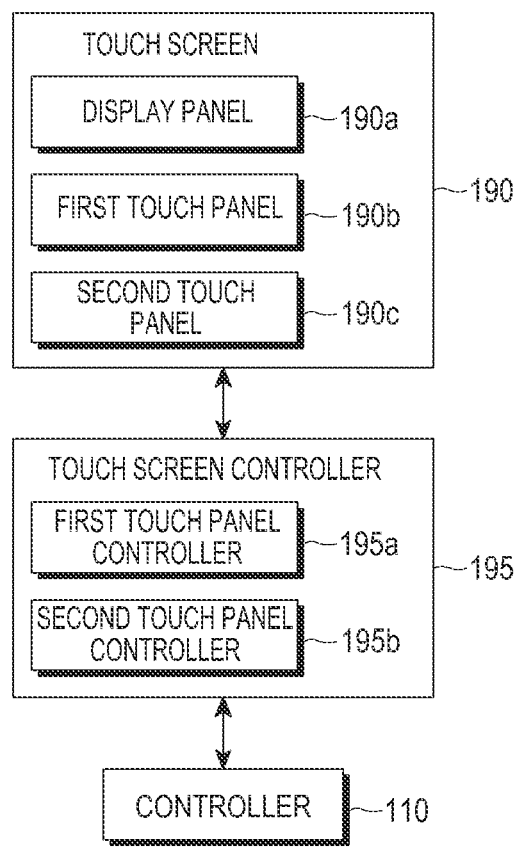
FIG. 2 is a block diagram illustrating configurations of a touch screen and a touch screen controller according to an exemplary embodiment of the present invention.

FIG. 2 illustrates configurations of a touch screen and a touch screen controller according to an exemplary embodiment of the present invention.

Referring to FIG. 2, the touch screen 190 includes a display panel 190a, a first touch panel 190b, and a second touch panel 190c.

The display panel 190a may include a Liquid Crystal Display (LCD), an Active Matrix Organic Light Emitting Diode (AMOLED), or the like, and may display various images according to various operation states of the wireless terminal 100, application execution, a service, and the like.

The first touch panel 190b is a capacitive type touch panel, which is coated with a dielectric in which both sides of a glass are coated with a metal conductive material (for example, an Indium Tin Oxide (ITO) film or the like) so that the first touch panel 190b allows a current to flow in the glass surface and stores a charge. When a surface of the first touch panel 190b is touched by an object, a uniform amount of charges moves to a contact position by static electricity, and the first touch panel 190b detects the touched position by recognizing a changed amount of current according to the movement of the charges. Through the first touch panel

190b, all touches which generate static electricity can be detected and touches by a hand or a pen can be detected.

The second touch panel 190c is an EMR type touch panel, which includes an electronic signal processor for sequentially providing an AC signal having a predetermined frequency to an electromagnetic induction coil sensor having a grid structure and each loop coil of the electromagnetic induction coil sensor, the grid structure including a plurality of loop coils disposed in a predetermined first direction and a second direction crossing the first direction. When there is the pen 200 having a resonant circuit therein near the loop coil of the second touch panel 190c, a magnetic field transmitted from the corresponding loop coil generates a current based on mutual electromagnetic induction to the resonant circuit within the pen 200. Based on such a current, an induced magnetic field is generated from the coil consisting of the resonant circuit within the pen 200, and the second touch panel 190c detects the induced magnetic field from the loop coil in a signal reception state so that an approach position or a touch position of the pen is detected.

Through the second touch panel 190c, an approach and a touch of an object which can generate a current based on electromagnetic induction can be detected.

A first touch panel controller 195a converts an analog signal received from the first touch panel 190b by detection of a touch by a finger or a pen to a digital signal (for example, X, Y, and Z coordinates) and transmits the converted digital signal to the controller 110. A second touch panel controller 195b converts an analog signal received from the second touch panel 190c by an approach of the pen 200 or touch detection to a digital signal and transmits the converted digital signal to the controller 110.

The controller 110 may control the display panel 190a, the first touch panel 190b, and the second touch panel 190c by using the digital signals received from the first and second touch panel controllers 195a and 195b.

For example, the controller 110 recognizes contents of a memo made by the user by the digital signals received from the first and second touch panel controllers 195a and 195b. Furthermore, the controller 110 controls the touch screen controller 195 to display the memo recognized based on the digital signals from the first and second touch panel controller 195a and 195b on the display panel 190a.

More particularly, when the controller 110 detects damage of particular memo contents based on the digital signals received from the first and second touch panel controllers 195a and 195b, the controller 110 deletes the damaged memo contents and provides edited memo contents in consideration of the deleted memo contents. Further, the controller 110 controls the touch screen controller 195 to display the edited memo contents on the display panel 190a.

Figure 3:
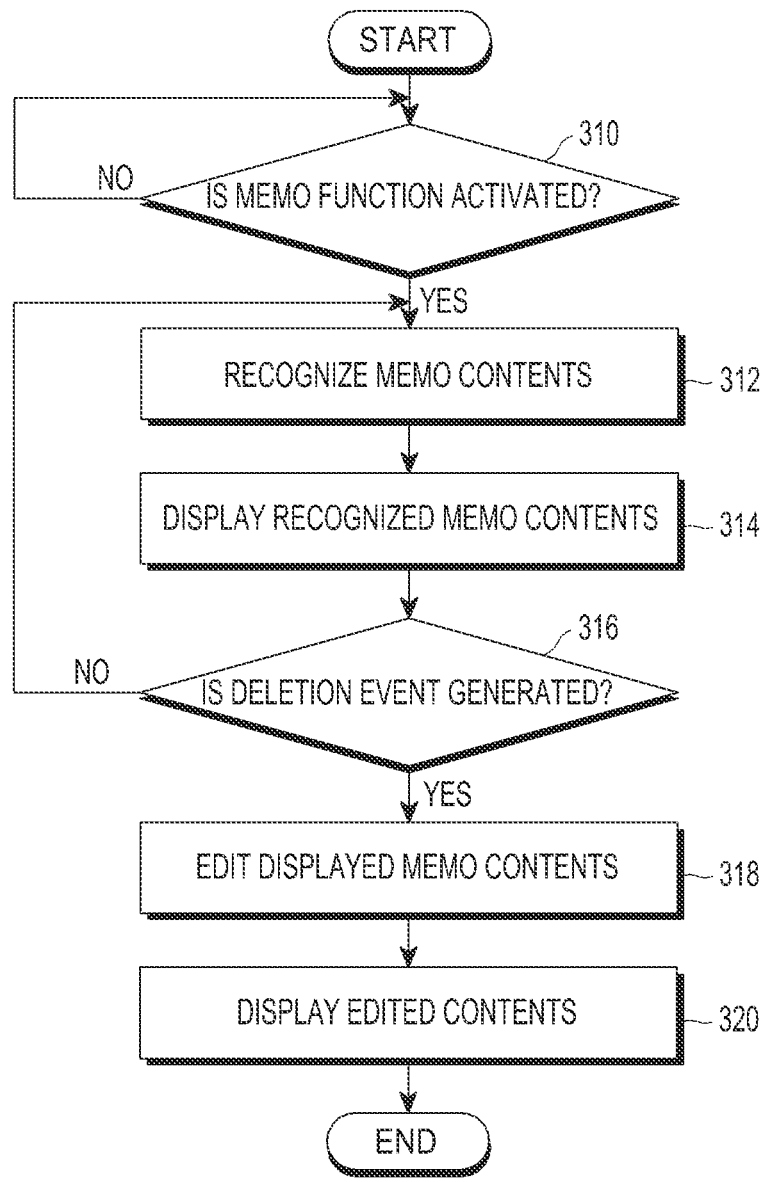
FIG. 3 illustrates a flowchart for editing contents of a memo in a user terminal supporting a writing based memo function according to an exemplary embodiment of the present invention.

FIG. 3 illustrates a flowchart for editing contents of a memo in a user terminal supporting a writing based memo function according to an exemplary embodiment of the present invention.

Referring to FIG. 3, the user terminal detects whether an activation of the writing based memo function is requested in step 310. For example, the user terminal may determine an execution request of an application supporting the memo function by the user as the request for the activation of the memo function.

The application supporting the memo function is not limited to an application supporting only the memo function. For example, the application may include an application providing another service based on the memo function, such as a scheduling application using the writing based memo function.

When the request for the activation of the memo function is detected, the user terminal executes the application corresponding to the detected request. The user terminal recognizes the memo contents input by the user based on the memo function supported by the executed application in step 312. Further, the user terminal displays the recognized memo contents on the screen in step 314.

The user terminal monitors whether an event for deleting the memo contents displayed on the screen is generated in step 316. The event for the deletion may include generation of a situation where a part or all of the memo contents are damaged. Here, the damage may mean that the corresponding memo contents cannot be clearly recognized. The damage may correspond to generation of a situation where particular memo contents cannot be recognized by additional writing on the particular memo contents by the user. That is, when a state where the particular memo contents cannot be normally recognized according to a user's intention is detected, it is determined that the situation where the memo contents are damaged is generated. For example, the user may damage the particular memo contents by drawing one or more lines on the particular memo contents or painting over the particular memo contents. Examples where the memo contents are damaged will be described below in more detail.

It is preferable that a color of the line drawn on or painted over the particular memo contents is the same as a color of the particular memo contents. This is because there may be a case in which the user draws a line in order to emphasize the memo contents by using a different color from that of the memo contents. In addition, the particular memo contents may be emphasized by using a closed loop, such as an oval, or the like.

When the user terminal recognizes the deletion event, the user terminal edits the contents displayed on the screen in step 318. Here, the editing includes an operation for removing a blank generated due to the deletion of the particular memo contents as well as the deletion of the particular memo contents by a user's request.

For example, the user recognizes a display area of the damaged memo contents on the screen and moves the recognized display area to a side of the screen, such as the left side or right side of the screen. That is, by moving the damaged memo contents to the side of the screen, an effect is obtained as if the corresponding memo contents are deleted.

However, when the damaged memo contents are deleted according to the example described above, the area where the damaged memo contents had been displayed is now displayed as a blank. Accordingly, the user terminal may perform an additional editing for removing the displayed blank.

For example, when there are remaining memo contents after the damaged memo contents, the user terminal recognizes an area displaying the remaining memo contents, and performs an edit for moving the recognized display area to the blank area. For example, the user terminal may move the area displaying the remaining contents until a start point in the blank area, which is generated due to the movement of the area where the damaged contents had been displayed, is matched with a start point in the area displaying the remaining contents after the damaged contents.

Although not illustrated, when a part of all of the memo contents displayed on the screen are damaged by the user, the user terminal may additionally perform a process of receiving an identification of whether to delete the damaged memo contents from the user before the deletion of the corresponding memo contents.

For example, when the part or all of the memo contents displayed on the screen are damaged by the user, the user terminal inquiries of the user whether to delete the damaged memo contents. At this time, the inquiry may be performed by a message displayed through the screen or a voice message through a speaker.

Thereafter, the user terminal may determine whether to delete the damaged memo contents by the response of the user to the inquiry. For example, the response of the user may be made by a written memo. For example, after the inquiry, the user terminal may recognize an input of a new memo by the user as the response to the inquiry. In addition, the user terminal may recognize an input of a function button displayed on the screen, recognition of an operation set by a deletion instruction, an input of a touch pattern set by the deletion instruction, or the like as the response to the inquiry.

When the editing of the memo contents displayed on the screen has been completed with reflection of the deletion of the damaged memo contents, the user terminal displays the memo contents having been completely edited on the screen in step 320. At this time, the memo contents displayed on the screen replace the conventionally displayed memo contents.

In addition to the above description, as an additionally adoptable scenario, there may be a case where the user damages memo contents which the user desires to delete and then adds new memo contents which replace the damaged memo contents to the vicinity of the damaged memo contents. In this case, the user terminal deletes the damaged memo contents and then moves newly added memo contents to a blank generated due to the deletion of the damaged memo contents.

FIGS. 5A to 8D illustrate various operations according to exemplary embodiments of the present invention. More specifically, FIGS. 5A to 6D illustrate replacing damaged memo contents with newly added memo contents, and FIGS. 7A to 8D illustrate replacing the damaged memo contents with conventional memo contents.

Figure 5A:
Figure 5B:
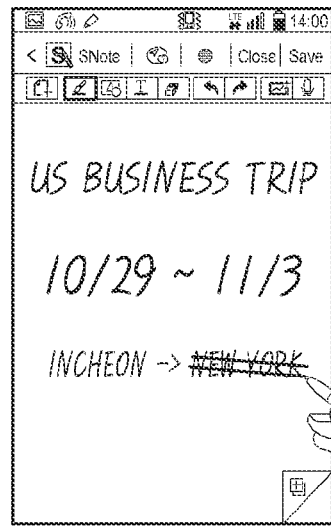

Referring to FIGS. 5A to 5D, the user writes contents, such as "U.S. business trip 10/29~11/3 Incheon→New York" by using the memo function supported by the user terminal (see FIG. 5A). Thereafter, the user makes a request for deleting a memo content "New York" by drawing two lines on the memo contents "New York" corresponding to a destination in the memo contents.

Figure 5C:
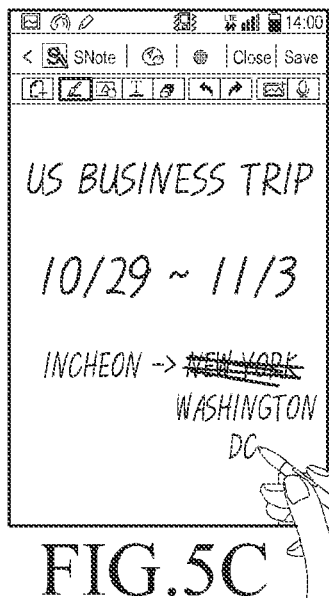
Figure 5D:
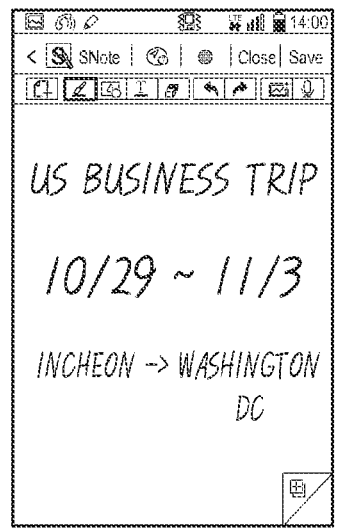

The user writes "Washington D.C." which replaces the memo content "New York" in the vicinity of the memo content "New York" on which two lines are drawn to make request for the deletion (see FIG. 5C). In this case, the user terminal deletes the memo content "New York" from the memo contents made by the request of the user in FIG. 5B, and moves the memo content newly written, that is, "Washington D.C." to a blank generated due to the deletion of the memo content in FIG. 5C and then displays "Washington D.C." (see FIG. 5D).

Figure 6A:
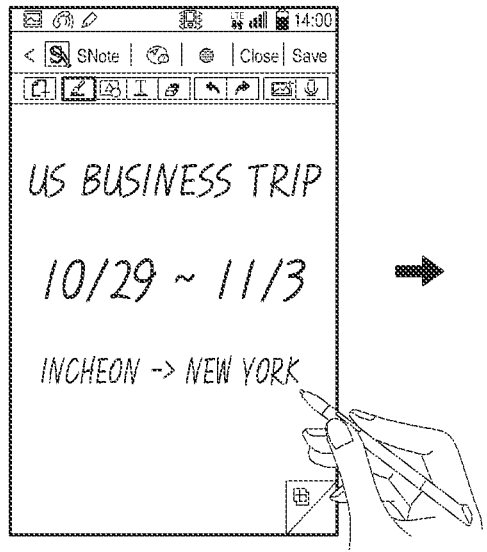
Figure 6B:
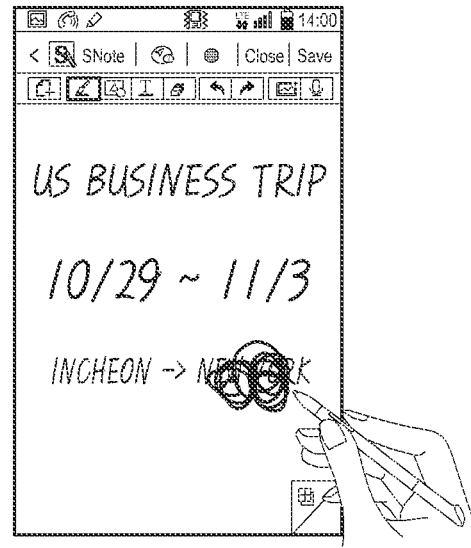

Referring to FIGS. 6A to 6D, the user writes contents, such as "U.S. business trip 10/29~11/3 Incheon→New York" by using the memo function supported by the user terminal (see FIG. 6A). Thereafter, the user makes a request for deleting a memo content "New York" by painting over the memo content "New York" corresponding to a destination in the memo contents (see FIG. 6B).

Figure 6C:
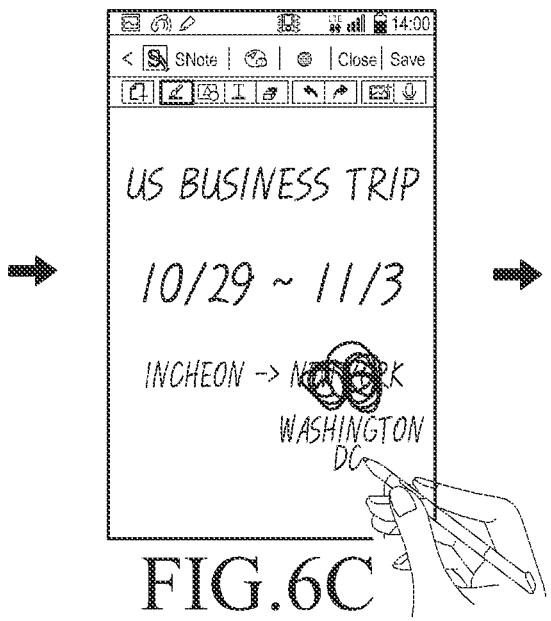
Figure 6D:
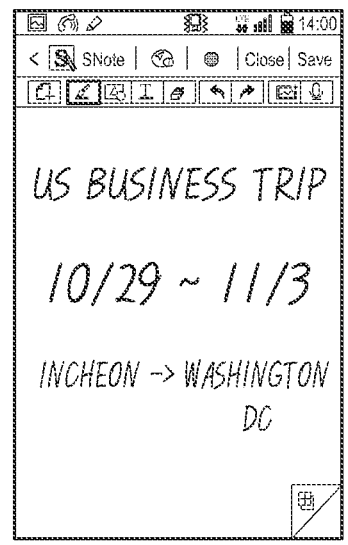

The user writes "Washington D.C." as a new destination, which replaces "New York" painted over to make request for the deletion in the vicinity of the memo content "New York" (see FIG. 6C). In this case, the user terminal deletes the memo content "New York" from the memo contents made by the request of the user in FIG. 6B, and moves the memo content newly written, that is, "Washington D.C." to a blank generated due to the deletion of the memo content in FIG. 6C and then displays "Washington D.C." (see FIG. 6D).

Referring to FIGS. 7A to 7D, the user writes contents, such as "Be sure to keep your appointment tonight" by using the memo function supporting by the user terminal (see FIG. 7A). Thereafter, the user makes a request for deleting a memo content "be sure" by drawing two lines on the particular content of the memo contents, that is, the memo content "be sure" (see FIG. 7B).

In this case, the user terminal deletes the memo content "be sure" from the memo contents made by the request of the user in FIG. 7B (see FIG. 7C). Then, the user terminal moves a memo content "keep" which is next to the deleted memo content "be sure" to a blank generated due to the deletion of the memo content "be sure" and then displays new memo contents (see FIG. 7D).

Figure 8A:

Referring to FIGS. 8A to 8D, the user writes contents, such as "Be sure to keep your appointment tonight" by using the memo function supported by the user terminal (see FIG. 8A). Thereafter, the user terminal makes a request for deleting a memo content "be sure" by painting over the particular content of the memo contents, that is, the memo content "be sure" (see FIG. 8B).

Figure 8B:
Figure 8C:
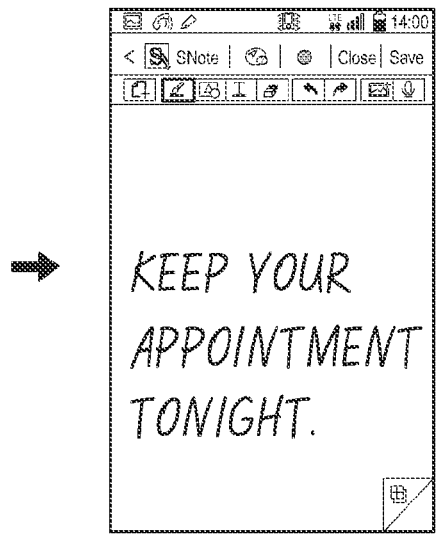
Figure 8D:
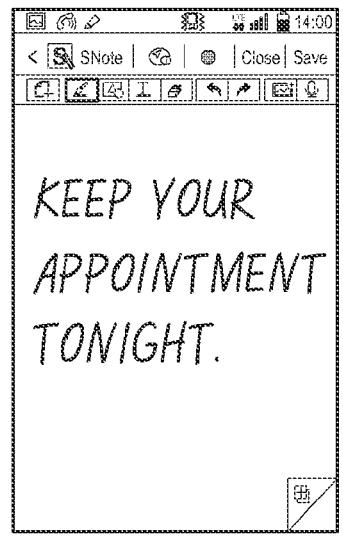

In this case, the user terminal deletes the memo content "be sure" from the memo contents made by the request of the user in FIG. 8B (see FIG. 8C). The user terminal moves the memo content "keep" which is next to the deleted memo content "be sure" to a blank generated due to deletion of the memo content "be sure" and displays the new memo contents (see FIG. 8D).

It may be appreciated that the exemplary embodiments of the present invention can be implemented in software, hardware, or a combination thereof. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can be also appreciated that the software may be stored in a machine (for example, a computer)-readable storage medium.

A content providing apparatus and method supporting the present invention may be implemented by a computer or a portable terminal including a controller and a memory, and the memory is one example of machine-readable storage media suitable for storing a program or programs including instructions implementing the exemplary embodiments of the present invention. Accordingly, exemplary embodiments of the present invention include a program for a code implementing the apparatus and method described in the appended claims of the specification and a machine (a computer or the like)-readable storage medium for storing the program.

In addition, the content providing apparatus and method may receive the program from a program providing apparatus connected either through a wire or wirelessly and store the received program. The program providing apparatus may include a program including instructions through which a graphic processing apparatus implements a preset content protecting method, a memory for storing information or the like required for the content protecting method, a communication unit for performing wired or wireless communication with the graphic processing apparatus, and a controller for transmitting the corresponding program to a transceiver according to a request of the graphic processing apparatus or automatically.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of editing a memo displayed on a screen based on a memo function in a user terminal supporting a writing based memo function, the method comprising:
   recognizing an initial content of the memo made by a user based on the memo function and displaying the initial content on the screen;
   temporarily storing the initial content in a buffer;
   recognizing an additional content of the memo made by the user based on the memo function and displaying the additional content on the screen;
   determining whether the initial content overlaps with the additional content at coordinate points of more than a predetermined number;
   if the initial content is overlapped with the additional content at the coordinate points of more than the predetermined number, determining whether the additional content has a same color as the initial content;
   if the initial content and the additional content have a different color, generating a new content configured to the initial content and the additional content on the screen and temporarily storing the new content in the buffer;
   if the initial content and the additional content have the same color, inquiring whether to delete a part of the initial content damaged by the additional content;
   if deletion is requested by the user based on the memo function, deleting the part of the initial content damaged by the additional content; and
   recognizing a new content of the memo made by the user based on the memo function and adding and displaying the new content to the deleted area on the screen.

2. The method of claim 1, wherein, when the part of the initial content are not interpreted as a letter, a word, or a sentence having a particular meaning, it is determined that the part of the initial content are damaged to an extent where the part of the initial content cannot be normally recognized.

3. The method of claim 1, wherein, when the part of the initial content are interpreted as a preset number or more of letters, words, or sentences, it is determined that the part of the initial content are damaged to an extent where the part of the initial content cannot be normally recognized.

4. A user terminal for editing a memo displayed on a screen based on a writing based memo function, the user terminal comprising:
   a user interface configured to exchange information according to the writing based memo function with a user;
   a buffer configured to temporarily store a content of the memo displayed on the screen; and
   a controller configured to:
      control the user interface and the buffer for editing the memo displayed on the screen,
      recognize an initial content of the memo made by the user based on the writing based memo function,
      control the user interface to display the initial content on the screen,
      temporarily store the initial content in the buffer,
      recognize an additional content of the memo made by the user based on the writing based memo function,
      control the user interface to display the additional content on the screen,
      determine whether the initial content overlaps with the additional content at coordinate points of more than a predetermined number,
      if the initial content is overlapped with the additional content at the coordinate points of more than the predetermined number, determine whether the additional content has a same color as the initial content,
      if the initial content and the additional content have a different color, generate a new content configured to the initial content and the additional content on the screen,
      temporarily store the new content in the buffer,
      if the initial content and the additional content have the same color, inquire whether to delete a part of the initial content damaged by the additional content,
      if deletion is requested by the user based on the memo function, delete the part of the initial content damaged by the additional content, and edit a remained content after the deleted,
      recognize a new content of the memo made by the user based on the memo function, and
      control the user interface to add and display the new content to the deleted area on the screen.

5. The user terminal of claim 4, wherein, when the part of the initial content are not interpreted as a letter, a word, or a sentence having a particular meaning, it is determined that the part of the initial content are damaged to an extent where the part of the initial content cannot be normally recognized.

6. The user terminal of claim 4, wherein, when the part of the initial content are interpreted as a preset number or more of letters, words, or sentences, it is determined that the part of the initial content are damaged to an extent where the part of the initial content cannot be normally recognized.

7. A method of editing a memo in a user terminal, the method comprising:
   determining an execution request of an application supporting a memo function;
   executing the application corresponding to the execution request;
   recognizing an initial memo made by a user based on the memo function and displaying the recognized initial memo on a screen;
   temporarily storing the recognized initial memo in a buffer;
   recognizing an additional memo made by the user based on the memo function and displaying the recognized additional memo on the screen;
   determining whether the recognized initial memo overlaps with the recognized additional memo at coordinate points of more than a predetermined number;
   if the recognized initial memo is overlapped with the recognized additional memo at the coordinate points of more than the predetermined number, determining whether the recognized additional memo has a same color as the recognized initial memo;
   if the recognized initial memo and the recognized additional memo have the same color, inquiring whether to delete a part of the initial content damaged by the additional content;
   if deletion is requested by the user based on the memo function, deleting a part of the recognized initial memo damaged by the recognized additional memo;

recognizing a new content of the memo made by the user based on the memo function;

if the new content is recognized, adding and displaying the new content to a blank generated due to the deletion of the part of the recognized initial memo and the recognized additional memo;

if the new content is not recognized, moving and displaying a remained part of the recognized initial memo displayed to a vicinity the deleted part of the recognized initial memo to the blank generated due to the deletion of the part of the recognized initial memo and the recognized additional memo; and if the recognized initial memo and the recognized additional memo have a different color, generating a content configured to the recognized initial memo and the recognized additional memo on the screen and temporarily storing the generated content in the buffer.

* * * * *